(12) United States Patent
Zhang et al.

(10) Patent No.: US 8,749,171 B2
(45) Date of Patent: Jun. 10, 2014

(54) LIGHTING APPARATUS AND CONTROL METHOD THEREOF

(75) Inventors: Wei-Qiang Zhang, Shanghai (CN); Li-Zhi Xu, Shanghai (CN); Qi Zhang, Shanghai (CN); Jian-Ping Ying, Shanghai (CN)

(73) Assignee: Delta Electronics Inc., Taoyuan Hsien (TW)

( * ) Notice: Subject to any disclaimer, the term of this patent is extended or adjusted under 35 U.S.C. 154(b) by 410 days.

(21) Appl. No.: 13/046,165

(22) Filed: Mar. 11, 2011

(65) Prior Publication Data

US 2012/0074866 A1 Mar. 29, 2012

(30) Foreign Application Priority Data

Sep. 25, 2010 (CN) .......................... 2010 1 0292907

(51) Int. Cl.
*H05B 37/02* (2006.01)
(52) U.S. Cl.
USPC .................... 315/307; 315/185 R; 315/300
(58) Field of Classification Search
USPC .......... 315/185 R, 186, 209 R, 224–226, 291, 315/294, 297, 299, 300, 301, 307, 308
See application file for complete search history.

(56) References Cited

U.S. PATENT DOCUMENTS

| | | | |
|---|---|---|---|
| 7,071,630 B1 * | 7/2006 | York ............................. | 315/224 |
| 7,265,504 B2 * | 9/2007 | Grant ............................ | 315/308 |
| 7,928,670 B2 * | 4/2011 | Chen et al. ................... | 315/308 |
| 7,973,487 B2 * | 7/2011 | Vaucourt et al. .............. | 315/224 |
| 8,203,281 B2 * | 6/2012 | Cegnar et al. ................. | 315/291 |
| 8,237,379 B2 * | 8/2012 | Liu ............................... | 315/307 |
| 2006/0279228 A1 * | 12/2006 | Kato ............................. | 315/193 |
| 2008/0224636 A1 * | 9/2008 | Melanson ..................... | 315/307 |
| 2010/0026208 A1 | 2/2010 | Shteynberg et al. | |
| 2013/0088078 A1 * | 4/2013 | Shteynberg et al. ............ | 307/31 |

FOREIGN PATENT DOCUMENTS

| | | |
|---|---|---|
| CN | 101631409 A | 1/2010 |
| JP | 2009302296 A | 12/2009 |

* cited by examiner

*Primary Examiner* — Tung X Le (74) *Attorney, Agent, or Firm* — Muncy, Geissler, Olds & Lowe, P.C.

(57) ABSTRACT

A lighting apparatus includes a lighting unit, a converting circuit, a sensing circuit, and a current control circuit. The lighting unit includes at least one light emitting diode and a switching device connected with each other in series. The converting circuit has an output end electrically connected to the lighting unit for driving it. The sensing circuit includes a sensing element capable of indirectly detecting the current flowing through the light emitting diode and outputting a feedback signal. The current control circuit receives a reference current, the feedback signal and a dimming command, and sends a dimming control signal to the lighting unit and a current control signal to the converting circuit, capable of controlling the amplitude of the current flowing through the light emitting diode.

19 Claims, 11 Drawing Sheets

FIG. 4B

LIGHTING APPARATUS AND CONTROL METHOD THEREOF

CROSS REFERENCE TO RELATED APPLICATIONS

This Non-provisional application claims priority under 35 U.S.C. §119(a) on Patent Application No(s). 201010292907.1 filed in People's Republic of China on Sep. 25, 2010, the entire contents of which are hereby incorporated by reference.

BACKGROUND OF THE INVENTION

1. Field of Invention

The present invention relates to a lighting apparatus and a control method thereof.

2. Related Art

The light emitting diode (LED) can be driven by a suitable current to emit desired light, and the brightness of the light emitted from the LED can be adjusted by controlling the current flowing therethrough. In general, the brightness of the LED can be adjusted by the way of continuous current dimming or pulse width modulation (PWM) dimming. Comparing these two dimming methods, the PWM dimming has the advantages of lower dimming depth and less color change, so it is widely used now. However, due to the variations in the both characteristics of LED and the output of power supply, it maybe results in the variation in the amplitude of LED at PWM dimming operation. Therefore, it is an important subject to provide a current with stable amplitude to the LED when using the PWM dimming method.

SUMMARY OF THE INVENTION

To achieve the aspect of the invention, a lighting apparatus, which includes a lighting unit, a converting circuit, a sensing circuit, and a current control circuit, is disclosed. The lighting unit includes at least one light emitting diode (LED) and a switching device, which are connected with each other in series. The converting circuit has an output end electrically connected to the lighting unit for driving it. The sensing circuit includes a sensing element for indirectly detecting the current flowing through the LED and outputting a feedback signal. The current control circuit receives a reference current, the feedback signal and a dimming command, and sends a dimming control signal to the lighting unit and a current control signal to the converting circuit for controlling the amplitude of the current flowing through the light emitting diode.

In addition, one aspect of the present invention also discloses a control method of a lighting apparatus. The lighting apparatus includes a lighting unit, a converting circuit, a current control circuit and a sensing circuit. The lighting unit includes at least one light emitting diode (LED). The control method includes the following steps of: indirectly detecting a current flowing through the LED by the sensing circuit so as to generate a feedback signal; receiving a dimming command to generate a dimming control signal to control the current of the LED; and receiving a reference current to generate a current control signal according to the dimming control signal, the reference current and the feedback signal, thereby controlling the amplitude of the current flowing through the light emitting diode.

As mentioned above, the lighting apparatus and the control method thereof of the aspect of the invention can indirectly detecting the current flowing through the LED by configuring a sensing circuit at different positions in the lighting apparatus. Compared with the method of directly detecting the branch current of the LED, the aspect of the present invention has the advantages of keeping the amplitude of the current flowing through the LED in constant, may preventing the overshoot current after turning on the LED during the starting period, or avoiding the generation of inrush current, which may damage the apparatus, flowing through the sensing resistor when the output end of the converting circuit is shorted.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
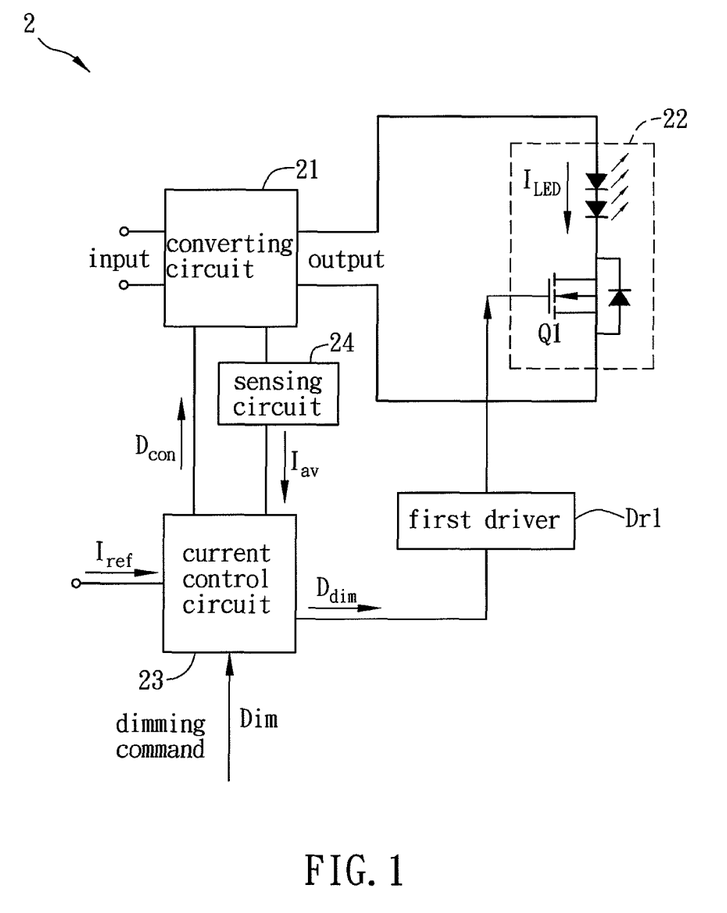
FIG. 1 is a schematic diagram showing a lighting apparatus of one embodiment of the present invention.

FIG. 1 is a schematic diagram showing a lighting apparatus according to an embodiment of the present invention.

With reference to FIG. 1, the lighting apparatus 2 includes a lighting unit 22, which has at least one light emitting diode LED. In this embodiment, the lighting apparatus 2 may also include a converting circuit 21, a current control circuit 23 and a sensing circuit 24. The converting circuit 21 is electrically connected to the lighting unit 22 capable of driving the light emitting diode LED. The current control circuit 23 is electrically connected to the converting circuit 21, the sensing circuit 24 and the lighting unit 22. The sensing circuit 24 indirectly detects the current $I_{LED}$ flowing through the light emitting diode LED and then outputs a feedback signal $I_{av}$. The current control circuit 23 receives a reference current $I_{ref}$, a dimming command Dim and the feedback signal $I_{av}$ and sends a dimming control signal $D_{dim}$ according to the received signals. The dimming control signal $D_{dim}$ passes through a first driver Dr1 and is transmitted to the light emitting diode LED, capable of adjusting the brightness thereof. The current control circuit 23 also sends a current control signal $D_{con}$ to the converting circuit 21, capable of controlling the amplitude of the current I flowing through the light emitting diode LED. To be noted, the reference current $I_{ref}$ can be generated from the internal of the lighting apparatus 2 or from the external apparatus. In addition, the converting circuit 21 of the lighting apparatus 2 can be, for example but not limited to, a fly-back converter, a buck converter, a boost converter, a buck-boost converter, a forward converter, a half-bridge converter, or a full-bridge converter.

Figure 2A:
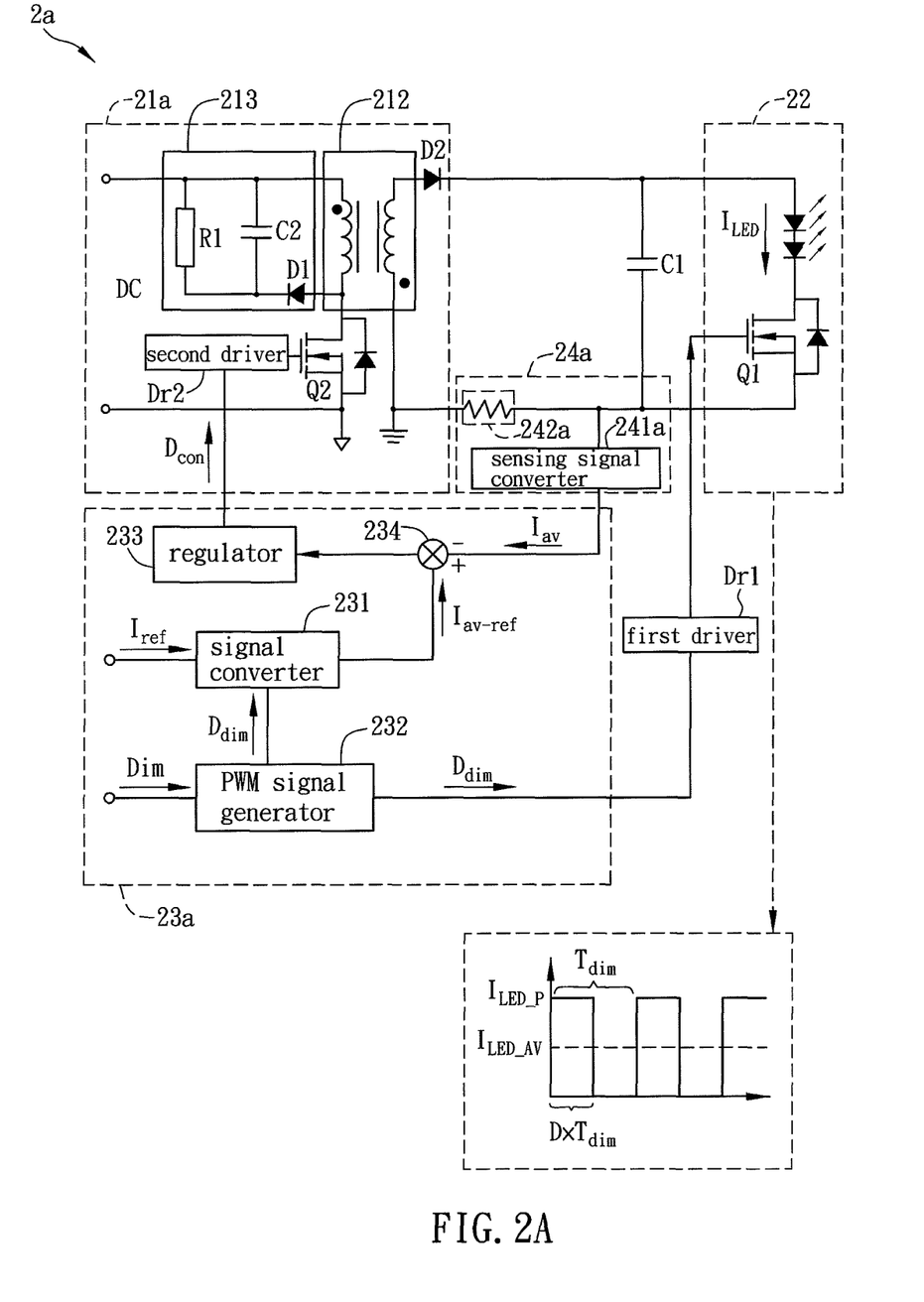
FIG. 2A to FIG. 2G are schematic diagrams showing several lighting apparatuses according to a first embodiment to a seven embodiment of the present invention.

FIG. 2A is a schematic diagrams showing a lighting apparatus 2a according to a first embodiment of the present invention. Referring to FIG. 2A, the converting circuit 21a is a fly-back converter and includes a buffer circuit 213, a transformer 212, a switch Q2 and a diode D2. The buffer circuit 213 is connected to the primary side of the transformer 212 and connected to the switch Q2 in series. One end of the secondary side of the transformer 212 is electrically connected to the anode of the diode D2, and the other end thereof is electrically connected to an output end of the converting circuit 21a. The cathode of the diode D2 is electrically connected to another output end of the converting circuit 21a. The buffer circuit 213 includes a resistor R1, a capacitor C2, and a diode D1, and it is capable of absorbing the energy of the leakage inductance of the transformer 212 when the switch Q2 is turned off. The resistor R1 and the capacitor C2 are connected in parallel and then connected to the diode D1 in series. In general, the switch Q2 can be, for example but not limited to, an MOSFET or a transistor. The switch Q2 has three ends. The first end of the switch Q2 is electrically connected to one end of the primary side of the transformer 212. The second end of the switch Q2 is electrically connected to a second driver Dr2. The third end of the switch Q2 is electrically connected to an input end of the converting circuit 21a. The other end of the primary side of the transformer 212 is electrically connected to another input end of the converting circuit 21a.

To be noted, in this embodiment, the input signal of the converting circuit 21a is a DC signal, which includes the signal generated by a battery, or a rectifying circuit that processes an AC voltage. When the input signal is an AC signal, which can be the common city electricity (90V to 250V, AC) or outputted from a power converter, an AC/DC converter (not shown) is necessary to be installed before the converting circuit 21a for receiving the input signal. For example, the detailed description thereof will be illustrated in the following third embodiment.

In this embodiment, the lighting unit 22 is electrically connected to the output end of the converting circuit 21a and includes at least one light emitting diode LED and a switch Q1, which is connected to the light emitting diode LED in series. To turn on/off the switch Q1 can control the current flowing through the light emitting diode LED, thereby adjusting the brightness of the light emitting diode LED. The switch Q1 has three ends. The first end of the switch Q1 is electrically connected to the light emitting diode LED. The second end of the switch Q1 is electrically connected to a first driver Dr1. The third end of the switch Q1 is electrically connected to an output end of the converting circuit 21a. In addition, the capacitor C1 is connected to the lighting unit 22 in parallel.

In this embodiment, the sensing circuit 24a includes a sensing element 242a and a sensing signal converter 241a. The sensing element 242a is connected to the lighting unit 22 and the capacitor C1, which are connected in parallel, in series. One end of the sensing element 242a connecting to the lighting unit 22 and the capacitor C1, which are connected in parallel, is electrically connected to the sensing signal converter 241a, and the other end of the sensing element 242a is electrically connected to the output end of the converting circuit 21a. Thus, the sensing signal converter 241a can indirectly retrieve the current sensing signal of the light emitting diode LED of the lighting unit 22 through the sensing element 242a, and generates a feedback signal $I_{av}$. The sensing element 242a can be a passive element such as a resistor. As shown in FIG. 2A, when the other end of the sensing element 242a is connected to the output end of the converting circuit 21a and is grounded, the sensing signal converter 241a is a low pass filter.

In the embodiment, the current control circuit 23a includes a signal converter 231, a PWM signal generator 232 and a regulator 233.

The PWM signal generator 232 receives a dimming command Dim and then outputs a dimming control signal $D_{dim}$ for controlling the first driver Dr1 to turn on/off the switch Q1 of the lighting unit 22, thereby adjusting the brightness of the light emitting diode LED. The wave of the current flowing through the light emitting diode LED of the lighting unit 22 is also shown in FIG. 2A. Herein, $T_{dim}$ is a cycle, $I_{LED\_P}$ is the amplitude of the current, and $I_{LED\_AV}$ is the average current flowing through the light emitting diode LED.

The signal converter 231 receives a reference current $I_{ref}$ and generates the average reference current $I_{av-ref}$ according to the dimming control signal $D_{dim}$ generated by the PWM signal generator 232.

The regulator 233 can output a current control signal $D_{con}$ according to the feedback signal $I_{av}$ and the average reference current $I_{av-ref}$. The current control signal $D_{con}$ is sent to the second driver Dr2 to adjust the output of the converting circuit 21a so as to control the amplitude of the current $I_{LED\_P}$ flowing through the light emitting diode LED.

Figure 3A:
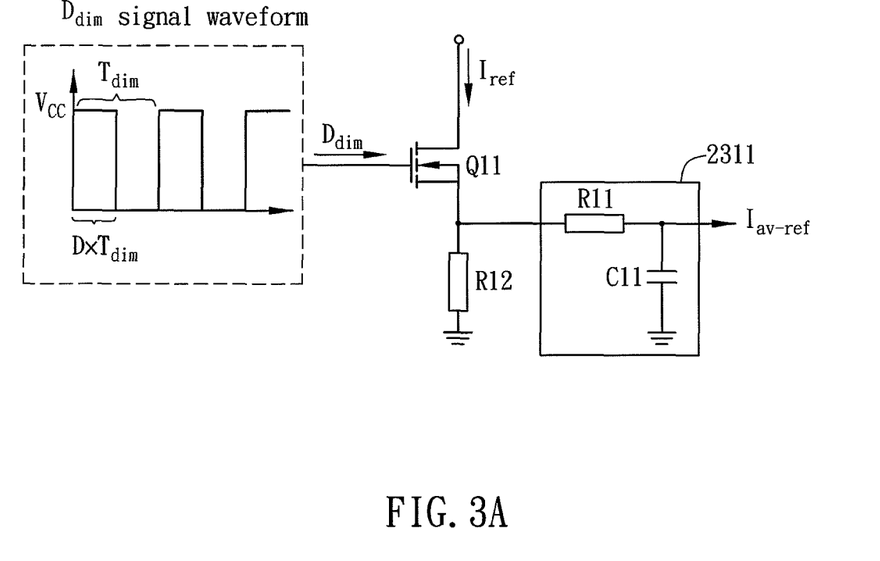
FIG. 3A and FIG. 3B are schematic diagrams showing the detailed circuit of the signal converters according to the embodiments of the present invention.

FIG. 3A is a schematic diagram showing the detailed circuit of the signal converter 231 according to the first embodiment of the present invention. In view of FIG. 3A, the signal converter 231 includes a switch Q11, a resistor R12 and a filter circuit 2311. A first end of the switch Q11 receives the reference current $I_{ref}$ of the light emitting diode, a second end thereof receives the dimming control signal $D_{dim}$, and a third end thereof is electrically connected to the resistor R12 and the filter circuit 2311. The filter circuit 2311 can be composed of, for example but not limited to, a resistor R11 and a capacitor C11, which are connected in series. For example, the dimming control signal $D_{dim}$, is a periodic square wave for driving the switch Q11, and the dimming control signal $D_{dim}$ has a cycle $T_{dim}$, a peak value $V_{cc}$, and a duty cycle D. Then, the dimming control signal $D_{dim}$ can be generated by using the PWM signal generator 232 to transform the dimming command Dim. In other words, the dimming control signal $D_{dim}$ can drive the switch Q11 of the signal converter 231 to transform the reference current $I_{ref}$ of the light emitting diode, which is transmitted from one end of the switch Q11 to the filter circuit 2311 for current signal processing, and finally the filter circuit 2311 outputs the average reference current $I_{av-ref}$. Accordingly, the signal converter 231 can transform the reference current $I_{ref}$ into the average reference current $I_{av-ref}$. Herein, the reference current $I_{ref}$ is inputted from external apparatus. In addition, the dimming control signal $D_{dim}$ generated by the PWM signal generator 232 is also transmitted to the lighting unit 22, so that the first driver Dr1 can drive the switch Q1.

Figure 3B:
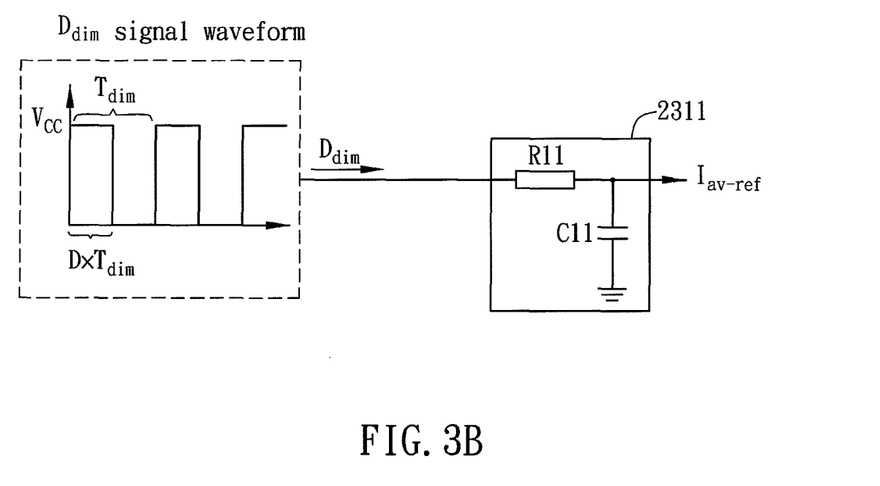

FIG. 3B is a schematic diagram showing the detailed circuit of the signal converter 231 according to the second embodiment of the present invention. The signal converter 231 of FIG. 3B is different from that of FIG. 3A in that the signal converter 231 can directly filter the dimming control signal $D_{dim}$, by the filter circuit 2311 and outputs the average reference current $I_{av-ref}$. In this case, the reference current $I_{ref}$ flowing through the light emitting diode LED is determined by the peak value $V_{cc}$ of the voltage signal in the lighting apparatus 2a.

Preferably, the regulator 233 further includes a comparing circuit 234, which can be, for example but not limited to, an amplifier. The comparing circuit 234 can compare the average reference current $I_{av-ref}$ and the feedback signal $I_{av}$ to obtain their difference value. Then, the regulator 233 generates a current control signal $D_{con}$ according to the difference value and transmits the current control signal $D_{con}$ to the second driver Dr2 to adjust the output of the converting circuit 21a so as to control the amplitude of the current $I_{LED\_P}$ flowing through the light emitting diode LED. The duty cycle D of the dimming control signal $D_{dim}$ can be changed by using the dimming command Dim to trigger the PWM signal generator 232.

Figure 2B:
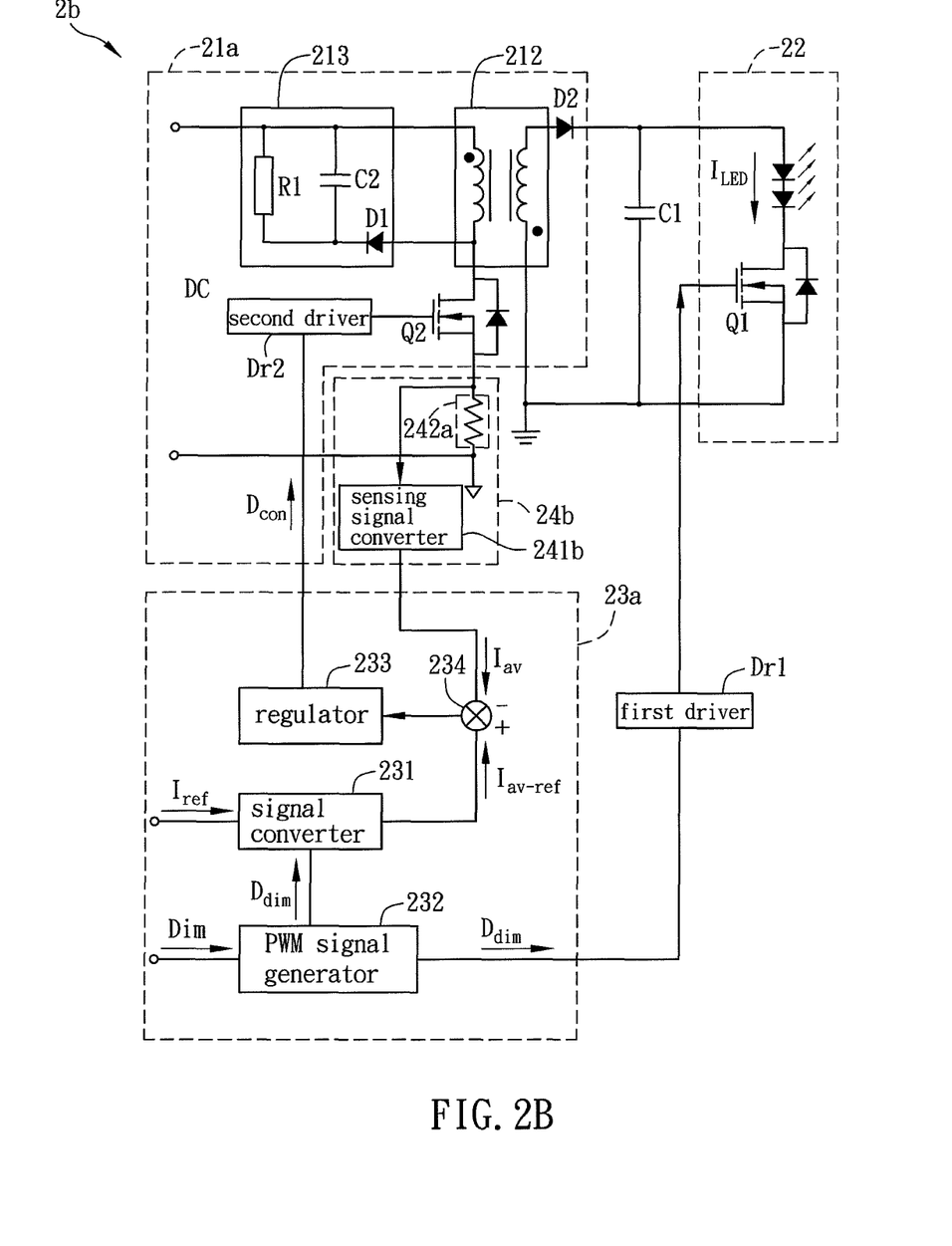

FIG. 2B is a schematic diagram showing a lighting apparatus 2b according to a second embodiment of the present invention. The lighting apparatus 2b of FIG. 2B is different from the lighting apparatus 2a of FIG. 2A in their compositions, connections and configurations, but the other circuit components, their configuration and the inputted signals are the same. The following description only illustrates the sensing circuit 24b for concise purpose. In this embodiment, the sensing circuit 24b includes a sensing element 242a and a sensing signal converter 241b. The sensing element 242a is connected to the switch Q2 in series. One end of the sensing element 242a, which connects to the switch Q2, is electrically connected to the sensing signal converter 241b, and the other end thereof is electrically connected to the input end of the converting circuit 21a. The sensing signal converter 241b indirectly receives the sensing signal with respect to the light emitting diode LED of the lighting unit 22 through the sensing element 242a, and generates a feedback signal $I_{av}$. The sensing element 242a can be a passive element such as a resistor. As shown in FIG. 2B, if the other end of the sensing element 242a is electrically connected to the input end of the converting circuit 21a and is grounded, the sensing signal converter 241b is a calculator. In this case, the sensing circuit 24b and the light emitting unit 22 are positioned at the primary side and the secondary side of the transformer 212, respectively, thereby forming an isolation circuit.

Figure 2C:
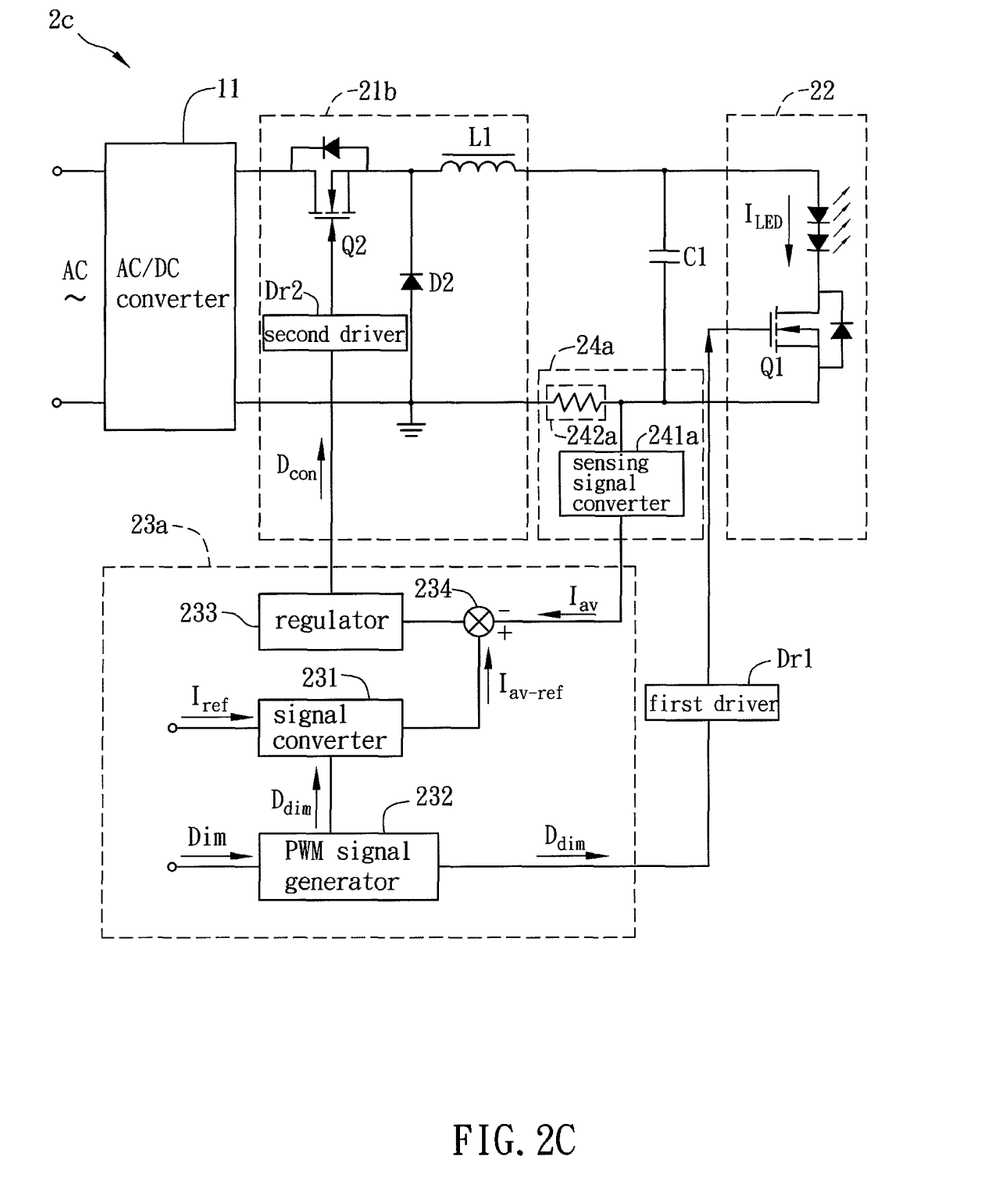

FIG. 2C is a schematic diagram showing a lighting apparatus 2c according to a third embodiment of the present invention. The lighting apparatus 2c of FIG. 2C is different from the lighting apparatus 2a of FIG. 2A in that the converting circuit 21b of the lighting apparatus 2c is a buck converter, which includes a switch Q2, an inductance L1 and a diode D2. The switch Q2 has three ends. The first end of the switch Q2 is electrically connected to one end of the inductance L1 and the cathode of the diode D2. The second end of the switch Q2 is electrically connected to a second driver Dr2. The third end of the switch Q2 along with the anode of the diode form the input end of the buck converter. The second driver Dr2 receives the current control signal $D_{con}$ from the current control circuit 23a to turn on/off the switch Q2, thereby controlling the amplitude of the current $I_{LED\_P}$ flowing through the light emitting diode. One end of the inductance L1 is electrically connected to one end of the switch Q2 and the cathode of the diode D2, and the other end thereof along with the anode of the diode D2 forms the output end of the buck converter. The cathode of the diode D2 is electrically connected to one end of the switch Q2, and the anode thereof, which is grounded, along with the other end of the inductance L1 forms the output end of the converting circuit 21b. As shown in FIG. 2C, the input signal of the converting circuit 21b of the embodiment is an AC signal which can be the common city electricity (90V to 250V, AC) or outputted from a power converter. In this case, an AC/DC converter 11 is necessary to be installed prior to the converting circuit 21b for converting the inputted AC signal into a DC signal and then transmitting the DC signal to the input end of the converting circuit 21b. One end of the output end of the AC/DC converter 11 is electrically connected to the switch Q2, and the other end thereof is grounded and electrically connected to the anode of the diode D2. If the inputted signal is a DC signal, it can be transmitted to the input end of the converting circuit 21b directly, so that the AC/DC converter 11 is not necessary.

To be noted, the other circuit components including the sensing circuit 24a has the same configurations as those shown in FIG. 2A, so the detailed descriptions thereof will be omitted. To be noted, in the first and second embodiments of the invention, the converting circuit is a buck converter and a fly-back converter for example. However, in practice, the converting circuit can also be a boost converter, a buck-boost converter, a forward converter, a half-bridge converter, or a full-bridge converter.

Figure 2D:
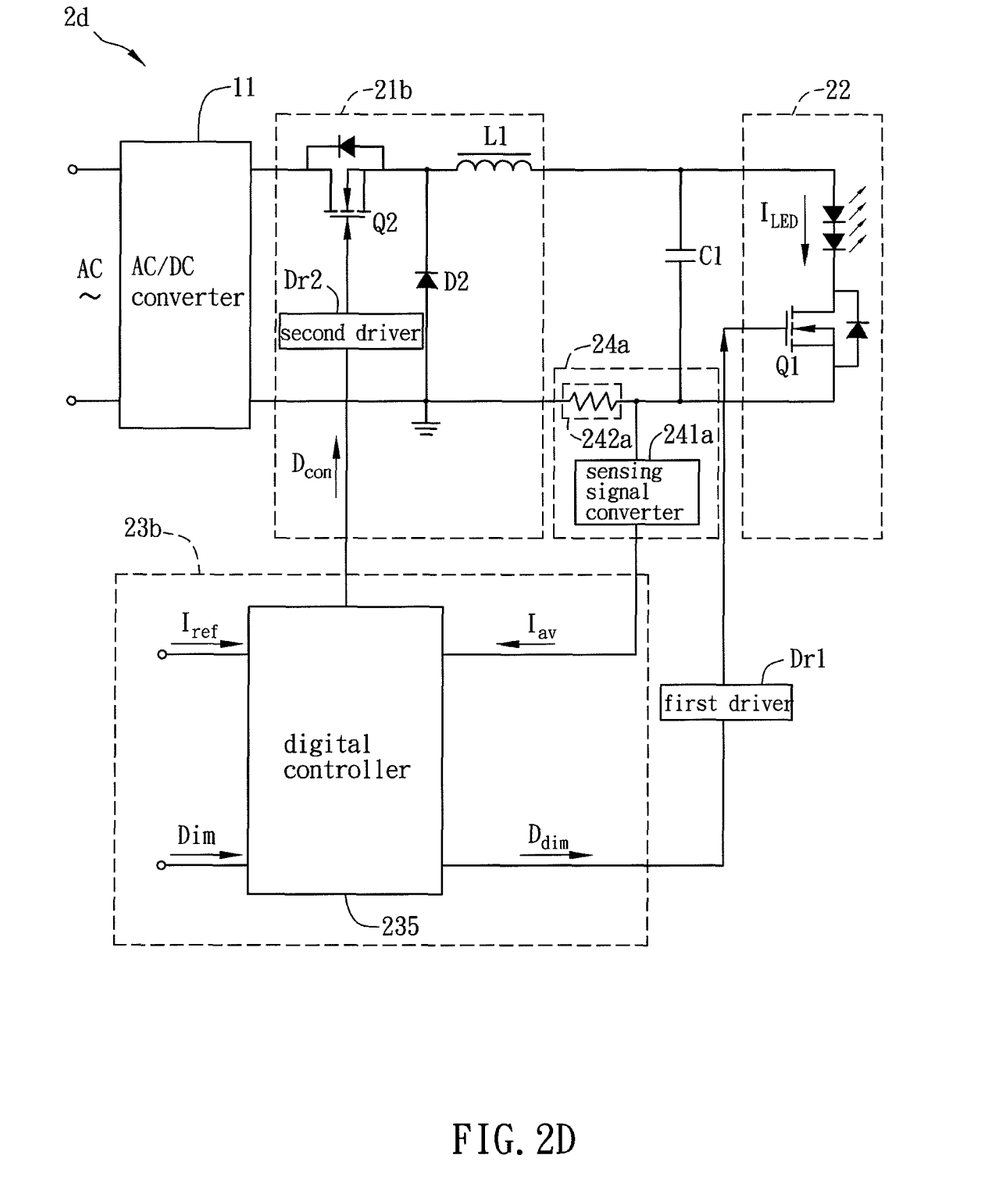

FIG. 2D is a schematic diagram showing a lighting apparatuses 2d according to a fourth embodiment of the present invention. The lighting apparatus 2d of FIG. 2D is different from the lighting apparatus 2c of FIG. 2C in the current control circuit 23b. The current control circuit 23b of this embodiment includes a digital controller 235, which generates a dimming control signal for controlling the first driver Dr1 to adjust the brightness of the light emitting diode LED based on the reference current $I_{ref}$, the feedback signal $I_{av}$ and the dimming command Dim. In addition, the digital controller 235 may also generate a current control signal $D_{con}$ and transmit it to the converting circuit 21b for controlling the amplitude of the current $I_{LED\_P}$ flowing through the light emitting diode. The residual circuit components and the inputted signal, including the sensing circuit 24a and its configuration, of this embodiment are all the same as those described in FIG. 2C.

Figure 2E:
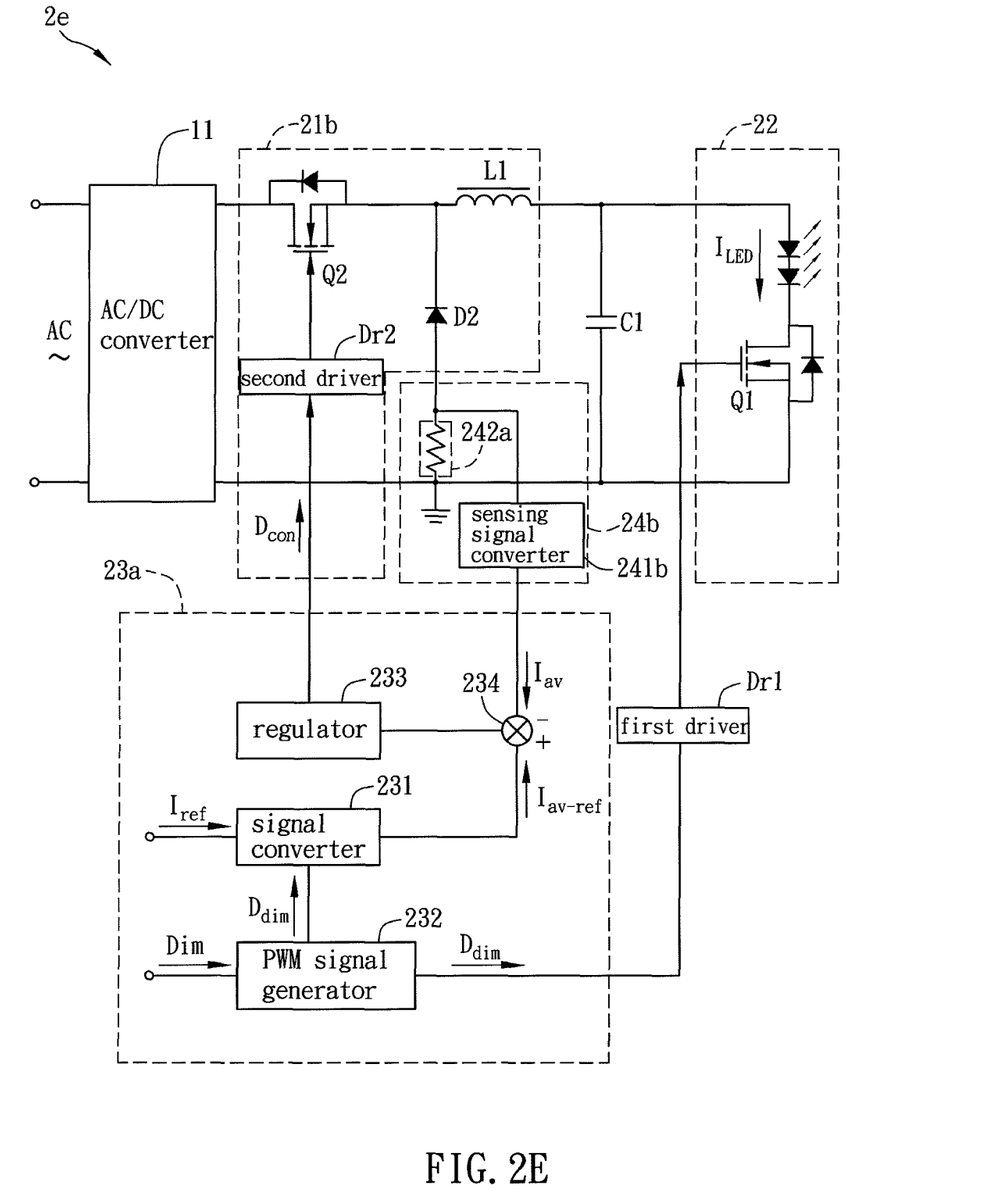
Figure 2F:
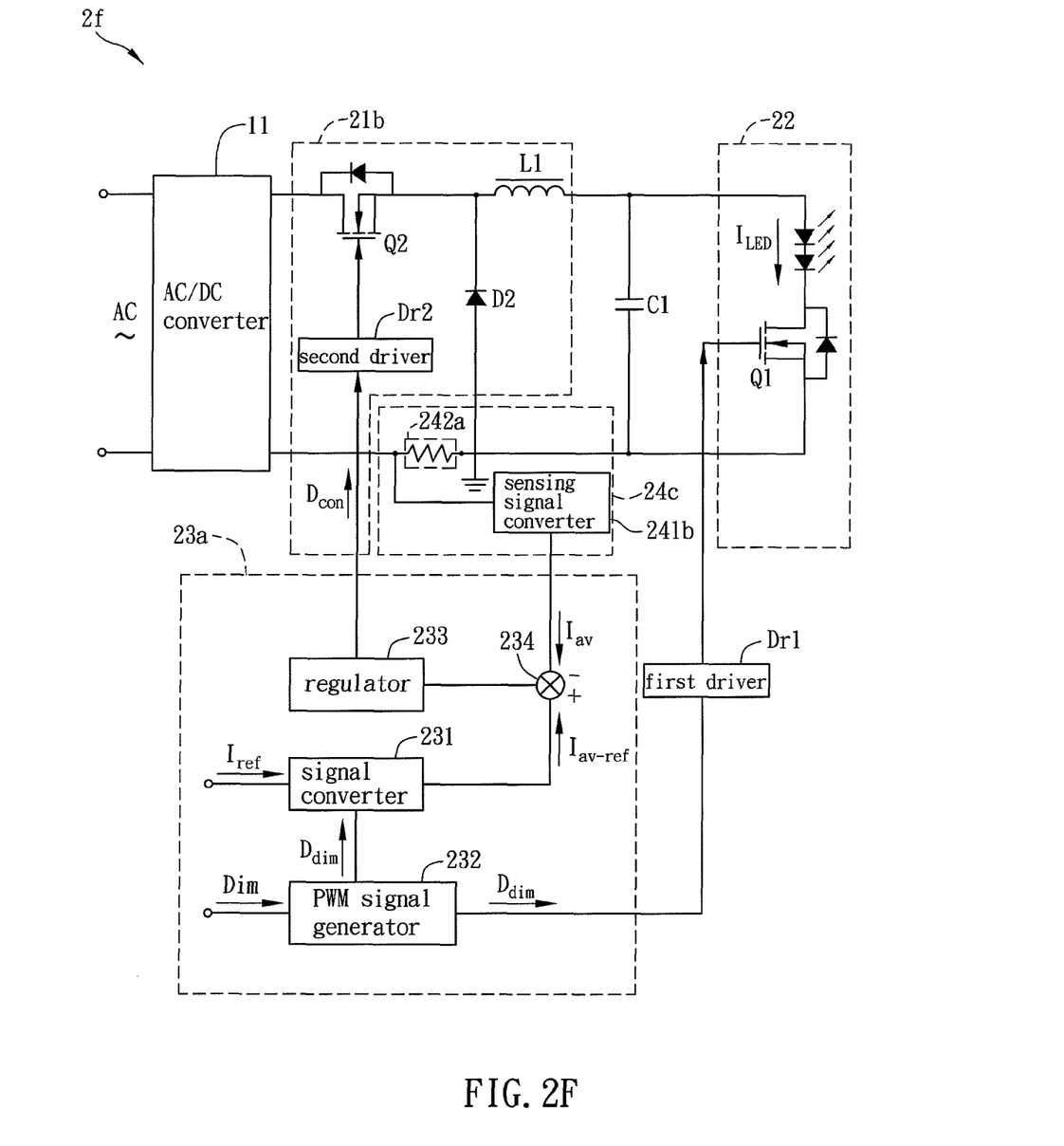

FIG. 2E and FIG. 2F are schematic diagrams showing the lighting apparatuses 2e and 2f according to a fifth embodiment and a sixth embodiment of the present invention. The lighting apparatuses 2e and 2f of FIGS. 2E and 2F are different from the lighting apparatus 2c of FIG. 2C in the composition, connection and configuration of the sensing circuits 24b and 24c, but the other circuit components, their configuration and the inputted signals are the same. The following description only illustrates the sensing circuits 24b and 24c for concise purpose.

Referring to FIG. 2E, the sensing circuit 24b includes a sensing element 242a and a sending signal converter 241b. The sensing element 242a is connected to the diode D2 of the converting circuit 21b in series. One end of the sensing element 242a, which is connected to the diode D2, is electrically connected to the sensing signal converter 241b, and the other end thereof is electrically connected to the input end of the converting circuit 21b and the capacitor C1 of the lighting unit, which are connected to each other in parallel. The sensing signal converter 241b indirectly receives the sensing signal with respect to the light emitting diode LED of the lighting unit 22 through the sensing element 242a, and generates a feedback signal $I_{av}$. The sensing element 242a can be a passive element such as a resistor. As shown in FIG. 2E, if the other end of the sensing element 242a is electrically connected to the input end of the converting circuit 21b and the capacitor C1 of the lighting unit 22, which are connected in parallel, and is grounded, the sensing signal converter 241b is a calculator.

With reference to FIG. 2F, the sensing circuit 24c includes a sensing element 242a and a sensing signal converter 241b. One end of the sensing element 242a is electrically connected to the input end of the converting circuit 21b and the sensing signal converter 241b, and the other end thereof is electrically connected to the anode of the diode D2 in the converting circuit 21b and the capacitor C1 of the lighting unit 22, which are connected in parallel, and then grounded. The sensing signal converter 241b indirectly receives the sensing signal with respect to the light emitting diode LED of the lighting unit 22 through the sensing element 242a, and generates a feedback signal $I_{av}$. The sensing element 242a can be a passive element such as a resistor. As shown in FIG. 2F, the sensing signal converter 241b is a calculator.

Figure 2G:
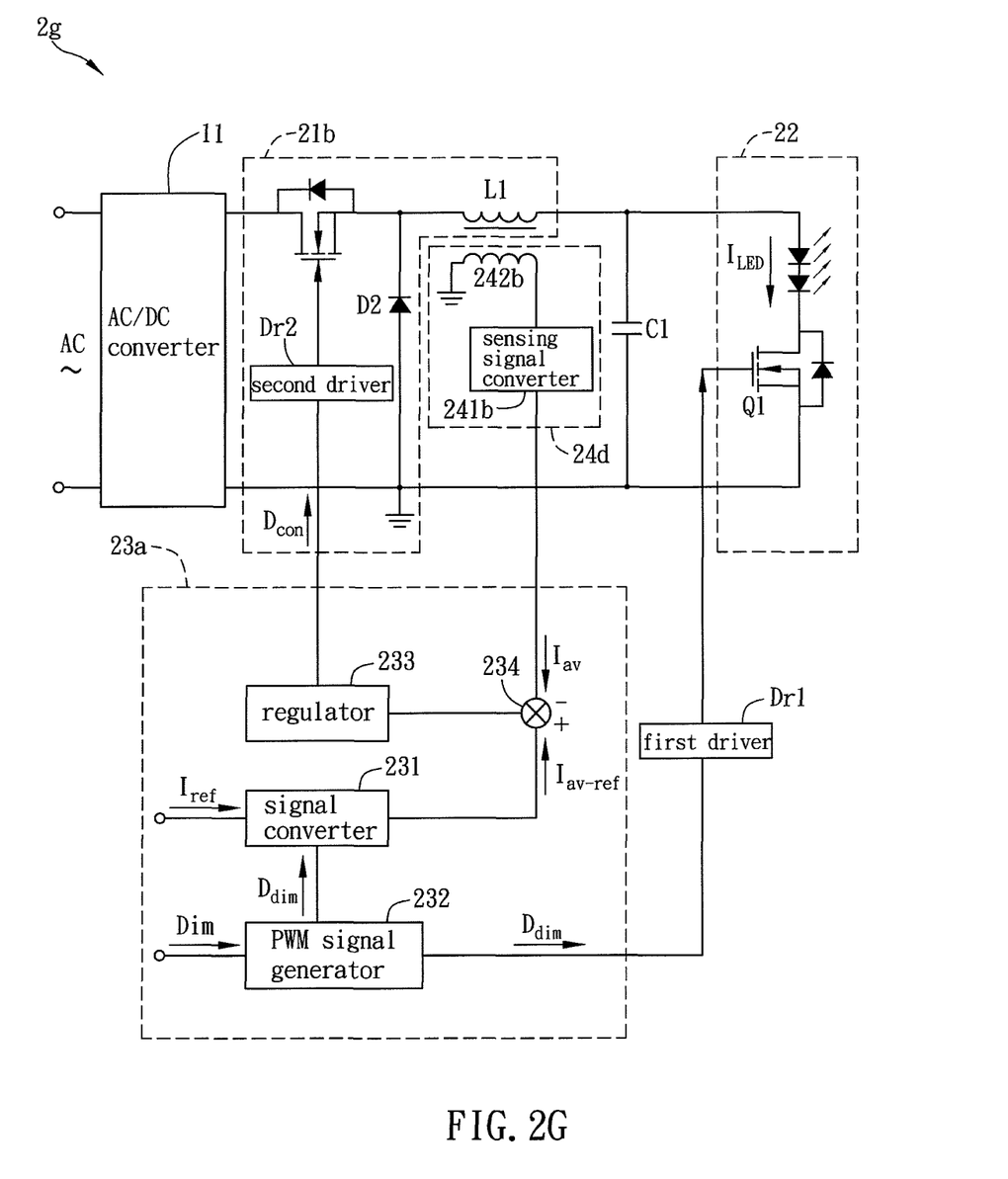

FIG. 2G is a schematic diagram showing a lighting apparatus 2g according to a seventh embodiment of the present invention. The lighting apparatus 2g of FIG. 2G is different from the lighting apparatus 2c of FIG. 2C in the composition, connection and configuration of the sensing circuit 24d, but the other circuit components, their configuration and the inputted signals are the same. The following description only illustrates the sensing circuit 24d for concise purpose. In this embodiment, the sensing circuit 24d includes a sensing element 242b and a sensing signal converter 241b. One end of the sensing element 242b is electrically connected to the sensing signal converter 241b, and is inductingly coupled to the inductance L1. The sensing signal converter 241b indirectly receives the sensing signal with respect to the light emitting diode LED of the lighting unit 22 through the sensing element 242b, and then generates a feedback signal $I_{av}$. The sensing element 242b can be a passive element such as a winding. As shown in FIG. 2G; if the other end of the sensing element 242b is grounded, the sensing signal converter 241b is a calculator.

In the above-mentioned embodiments, the sensing elements of the sensing circuits 24a, 24b, 24c and 24d can be a current transformer, so that the sensing signal converter can indirectly receive the current signal of the light emitting diode LED of the lighting unit 22 through the current transformer, and generates a feedback signal $I_{av}$.

Figure 4A:
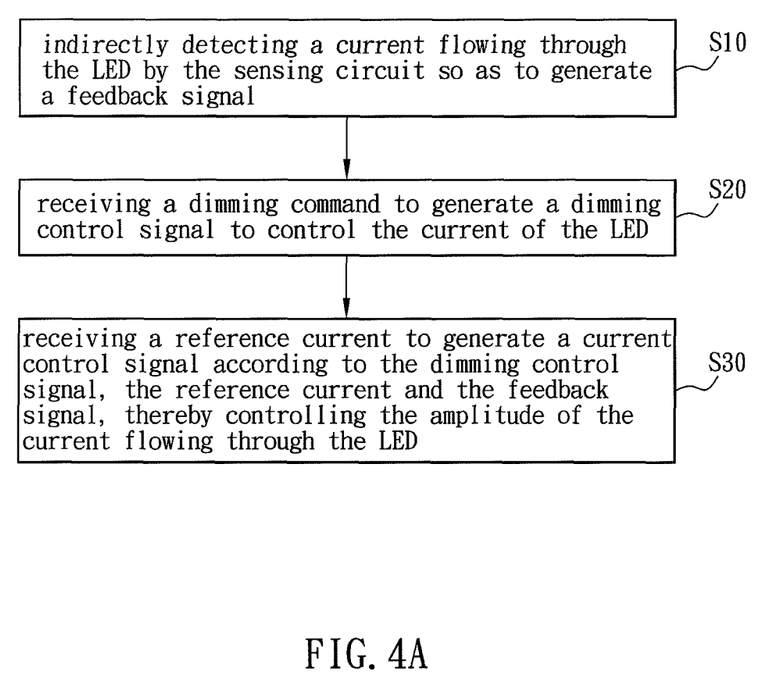
FIG. 4A and FIG. 4B are flow charts showing the control method of the lighting apparatus according to the embodiments of the present invention.

FIG. 4A is a flow chart showing the control method of the lighting apparatus according to one embodiment of the present invention. Herein, the lighting apparatus includes a lighting unit, a converting circuit, a current control circuit and a sensing circuit. The lighting unit includes at least one light emitting diode. The connections and structures of the lighting apparatus are described in the above embodiments, so the detail descriptions thereof will be omitted. The control method includes the following steps of: indirectly detecting a current flowing through the light emitting diode by the sensing circuit so as to generate a feedback signal (S10); receiving a dimming command to generate a dimming control signal to control the current of the light emitting diode (S20); and receiving a reference current to generate a current control signal according to the dimming control signal, the reference current and the feedback signal, thereby controlling the amplitude of the current flowing through the light emitting diode (S30).

Figure 4B:
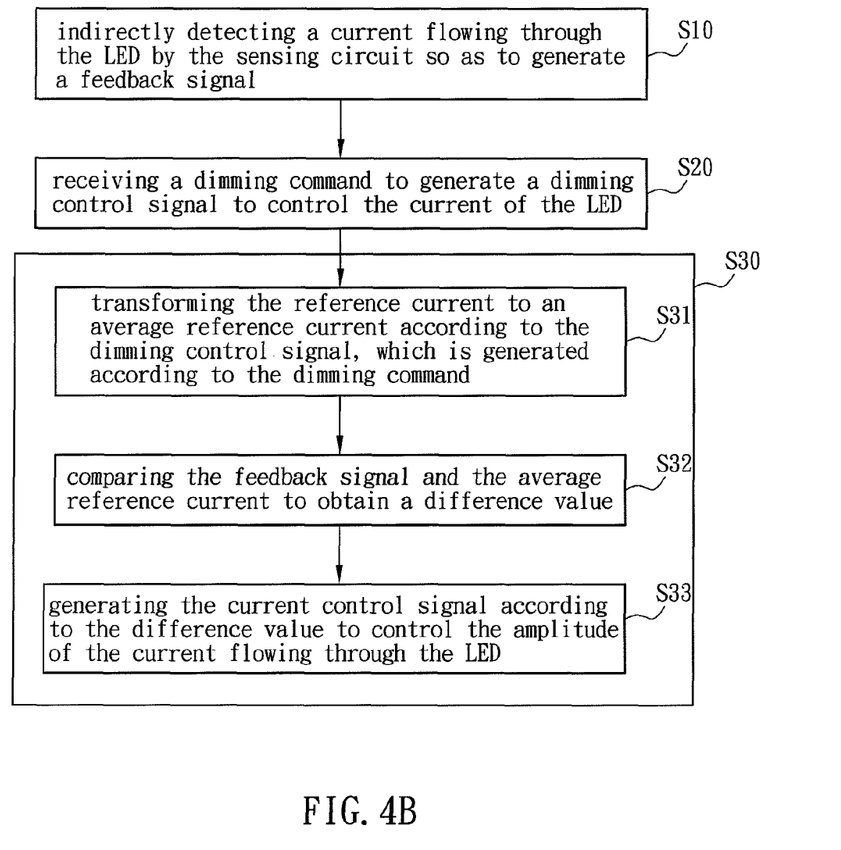

In a preferred embodiment, the step S30 may further include the following steps of (as shown in FIG. 4B): transforming the reference current to an average reference current according to the dimming control signal, which is generated according to the dimming command (S31); comparing the feedback signal and the average reference current to obtain a difference value (S32); and generating the current control signal according to the difference value to control the amplitude of the current flowing through the light emitting diode (S33). In addition, the reference current can be generated from the internal of the lighting apparatus or inputted from an external apparatus.

In summary, the lighting apparatus and the control method thereof of the invention can indirectly detecting the current flowing through the LED by configuring a sensing circuit at different positions in the lighting apparatus. Compared with the method of directly detecting the branch current of the LED, the aspect of the present invention may has the advantages of keeping the amplitude of the current flowing through the LED in constant, preventing the overshoot current after turning on the LED during the starting period, or avoiding the generation of inrush current, which may damage the apparatus, flowing through the sensing resistor when the output end of the converting circuit is shorted.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A lighting apparatus, comprising:
   a lighting unit comprising at least one light emitting diode and a switching device connected with each other in series;
   a converting circuit having an output end electrically connected to the lighting unit for driving the lighting unit;
   a sensing circuit comprising a sensing element, capable of indirectly detecting the current flowing through the light emitting diode and outputting a feedback signal; and
   a current control circuit receiving a reference current, the feedback signal and a dimming command and capable of sending a dimming control signal to the lighting unit and a current control signal to the converting circuit for controlling the amplitude of the current flowing through the light emitting diode,
   wherein the current control circuit comprises:
   a pulse width modulation (PWM) signal generator receiving an external dimming signal and capable of outputting the dimming control signal to the lighting unit;
   a signal converter receiving the reference current and transforming the reference current to an average reference current according to the dimming control signal; and
   a regulator generating a current control signal according to the average reference current and the feedback signal and capable of transmitting the current control signal to the converting circuit.

2. The lighting apparatus according to claim 1, wherein the reference current is generated inside the lighting apparatus or is inputted from an external device and the converting circuit is a fly-back converter, a buck converter, a boost converter, a buck-boost converter, a forward converter, a half-bridge converter, or a full-bridge converter.

3. The lighting apparatus according to claim 1, wherein the current control circuit further comprises:
   a comparing circuit electrically connected to the regulator, and comparing the average reference current with the feedback signal so as to output a current difference.

4. The lighting apparatus according to claim 1, further comprising:
   a capacitor connected to the lighting unit in parallel, wherein the sensing circuit further comprises a sensing signal converter.

5. The lighting apparatus according to claim 4, wherein the sensing element of the sensing circuit connects to the lighting unit and the capacitor, which are connected in parallel, in series, one end of the sensing element connecting to the lighting unit and the capacitor is electrically connected to the sensing signal converter, and the other end of the sensing element is electrically connected to the output end of the converting circuit.

6. The lighting apparatus according to claim 5, wherein the other end of the sensing element is electrically connected to the output end of the converting circuit and is grounded, and the sensing signal converter is a filter.

7. The lighting apparatus according to claim 5, wherein the converting circuit is a fly-back converter, a buck converter, a boost converter, a buck-boost converter, a forward converter, a half-bridge converter, or a full-bridge converter.

8. The lighting apparatus according to claim 7, wherein the current control circuit is a digital controller.

9. The lighting apparatus according to claim 4, wherein the sensing element is a resistor or a current transformer.

10. The lighting apparatus according to claim 4, wherein the converting circuit is a fly-back converter comprising:
   a buffer circuit;
   a transformer having a primary side connected to the buffer circuit in parallel;
   a switch connecting to the buffer circuit and the primary side of the transformer, which are connected in parallel, in series, and is turned on or turned off according to the current control signal from the current control circuit; and
   a diode connecting to a secondary side of the transformer;
   wherein the sensing element of the sensing circuit is connected to the switch in series, one end of the sensing element connected to the switch is further electrically connected to the sensing signal converter, and the other end of the sensing element is electrically connected to an input end of the converting circuit.

11. The lighting apparatus according to claim 10, wherein the other end of the sensing element is electrically connected to the input end of the converting circuit and is grounded, and the sensing signal converter is a calculator.

12. The lighting apparatus according to claim 10, wherein the sensing element is a resistor or a current transformer.

13. The lighting apparatus according to claim 4, wherein the converting circuit is buck converter comprising:
   a switch;
   a diode having a cathode, which is electrically connected to one end of the switch, and an anode, which is grounded; and
   an inductance having one end electrically connected to one end of the switch and the cathode of the diode, wherein the other end of the inductance and the anode of the diode form an output end of the buck converter;
   wherein the other end of the switch and the anode of the diode form an input end of the buck converter, and the switch is turned on or turned off according to the current control signal outputted from the current control circuit.

14. The lighting apparatus according to claim 13, wherein the sensing element and the diode of the buck converter are connected in series, one end of the sensing element, which is connected to the diode, is further electrically connected to the sensing signal converter, and the other end of the sensing element is electrically connected to the input end of the buck converter, the lighting unit and the capacitor, which are connected in parallel.

15. The lighting apparatus according to claim 14, wherein the sensing element is a resistor or a current transformer.

16. The lighting apparatus according to claim 14, wherein the other end of the sensing element is electrically connected to the input end of the buck converter, the lighting unit and the capacitor, which are connected in parallel, and grounded, and the sensing signal converter is a calculator.

17. The lighting apparatus according to claim 13, wherein one end of the sensing element is electrically connected to the anode of the diode of the buck converter, the lighting unit and the capacitor, which are connected in parallel, and grounded, the other end of the sensing element is electrically connected to the input end of the buck converter and the sensing signal converter, and the sensing signal converter is a calculator.

18. The lighting apparatus according to claim 13, wherein the sensing element is inductively coupled with the inductance of the buck converter, and the sensing signal converter is a calculator.

19. A control method of a lighting apparatus, wherein the lighting apparatus comprises a lighting unit, a converting circuit, a current control circuit and a sensing circuit, and the lighting unit comprises at least one light emitting diode, the control method comprising steps of:
   indirectly detecting a current flowing through the light emitting diode by the sensing circuit so as to generate a feedback signal;
   receiving a dimming command to generate a dimming control signal to control the current of the light emitting diode;
   receiving a reference current to generate a current control signal according to the dimming control signal, the reference current and the feedback signal, thereby controlling the amplitude of the current flowing through the light emitting diode, wherein the reference current is from the internal of the lighting apparatus or an external apparatus;
   transforming the reference current to an average reference current according to the dimming control signal;
   comparing the feedback signal and the average reference current to obtain a difference value; and
   generating the current control signal according to the difference value to control the amplitude of the current flowing through the light emitting diode.

* * * * *